B. A. FISKE.
READING MACHINE.
APPLICATION FILED NOV. 20, 1920.
1,411,008.
Patented Mar. 28, 1922.
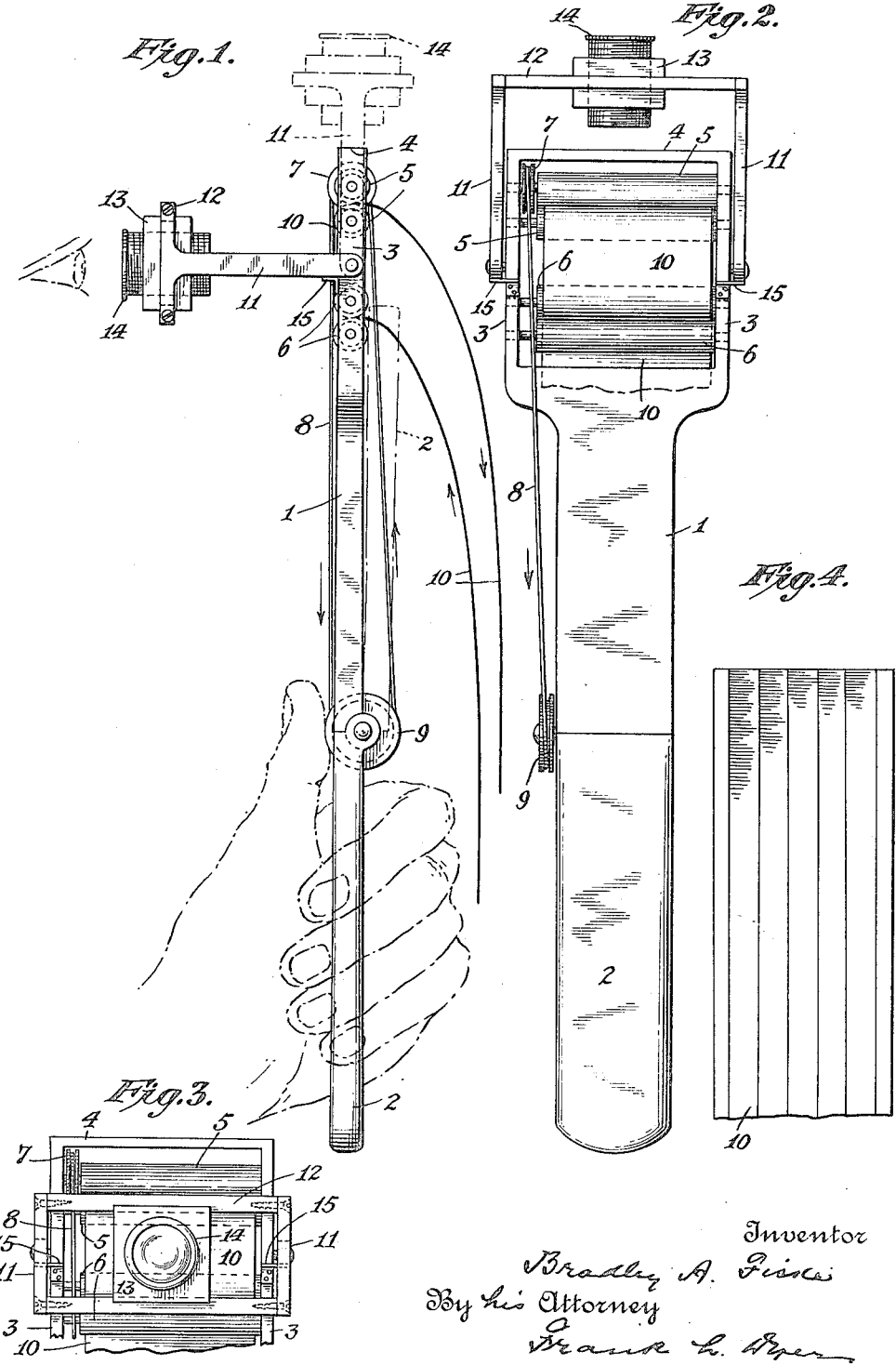

UNITED STATES PATENT OFFICE.

BRADLEY A. FISKE, OF WASHINGTON, DISTRICT OF COLUMBIA.

READING MACHINE.

1,411,008.  Specification of Letters Patent.  Patented Mar. 28, 1922.

Application filed November 20, 1920. Serial No. 425,432.

*To all whom it may concern:*

Be it known that I, BRADLEY A. FISKE, a citizen of the United States, residing at Washington, in the District of Columbia, and having a post-office address at Stoneleigh Court, Washington, D. C., have invented certain new and useful Improvements in Reading Machines; and I hereby declare that the following is a full, clear, and exact description of the same.

My invention relates to new and useful improvements in reading machines of the general character disclosed and claimed in my application for Letters Patent filed June 17, 1920, Serial No. 389,691, the machine employing reading matter, the words and character of which are microscopic, adapted to be brought successively before the eye or eyes of the observer so as to be read.

With my present device I provide a simpler construction than that disclosed in my said application, one in fact which can be conveniently carried in the pocket of the user and which will be capable of very simple and effective operation. I propose carrying the reading matter for use with my improved device on both sides of a strip of paper or other suitable flexible matter. I find that it is entirely feasible, by suitable photographic or other process, to reduce a two and one-half inch column of typewritten or printed matter to a column one-quarter of an inch wide, so that by arranging five of such columns side by side and on both sides of a paper tape, which need not have a width greater than one and one-half inches, it becomes possible to present one hundred thousand words, the length of an average book, on a tape slightly longer than forty inches.

I propose using such a tape with my improved reading machine, provision being made whereby successive portions of the tape can be brought within the focus of a suitable magnifying glass, or within the focus of a lens system, as disclosed in my prior application, if both eyes are to be used. The tape, being suitably mounted in the machine, is advanced successively before the magnifying glass, the reader observing and reading the lines of the column under observation appearing in the field of view, and after reading these lines the tape is again advanced to bring a fresh portion of the column into the field of view. Provision is made to keep that portion of the tape under observation perfectly flat, whereby it will remain in proper focus. The improved device employs convenient means for the manipulation of the tape during reading as well as other features of construction and operation, all as will be more fully hereinafter described and claimed.

In order that the invention may be better understood, attention is directed to the accompanying drawing forming a part of this specification and in which Fig. 1 is a side view of the device in its preferred form, illustrating in dotted lines the position of the lens or magnifying device and the handle when folded.

Fig. 2 is a front view of the same with the lens in the position shown in dotted lines in Fig. 1.

Fig. 3 is a front view illustrating a suitable manner of mounting the lens whereby it may be moved sidewise to bring into the field of view any one of the columns on the tape; and Fig. 4 is a separate view showing a portion of the tape having five columns of microscopic reading matter thereon.

In all of the above views corresponding parts are represented by the same reference numerals.

The frame 1 is provided at its lower end with a handle 2 pivoted to the same, which handle may be folded upwards to the position shown in dotted lines Fig. 1, thus permitting the device to be carried in the pocket of the user. The frame 1 is formed with side members 3 and a top member 4 and between the side members I mount two sets of rollers, 5, 5, and 6, 6, as shown. These rollers are preferably faced with rubber or similar material to provide the necessary friction on the tape in order that it may be kept suitably flat in the field of view. The upper rollers 5, 5 are pressed somewhat more firmly together than the lower rollers 6, 6 so that when one of the upper rollers is turned the tape will be fed against the slight retarding effect due to the other rollers. One of the upper rollers 5 is moved in any suitable way to bring successive portions of the tape into the field of view, a convenient arrangement being that shown where the shaft of the uppermost roller is provided with a pulley 7, over which passes a belt 8 around a pulley 9 mounted preferably on the pivot forming the joint between the sections 1 and 2.

It will be seen that when the handle 2 is grasped by the hand of the reader, the pulley 9 will be conveniently located adjacent to the thumb of either hand, so that by giving the pulley 9 a rotating movement the roller 5 will be fed to draw the tape across the field of view.

The tape 10 is formed of paper or other suitable material and preferably carries reading matter on both sides, which is preferably disposed in a plurality of parallel columns, five of such columns being illustrated in Fig. 4.

The microscopic reduction of the printed matter is secured in any suitable way.

Pivoted to the side members 3 are two arms 11, 11, carrying a rectangular frame 12 in which is mounted a slide 13 carrying the magnifying lens or glass 14. The slide 13 may be adjusted sidewise in the frame 12 so as to bring any desired column in the field of view, as will be understood.

The lens or glass is carried in the usual lens tube, screw-threaded within the slide 13, whereby focusing may be effected. Two small brackets 15 are shown to limit the downward movement of the arms 11, whereby the lens will be firmly supported perpendicularly with respect to the matter to be read. When the device is to be folded so as to be carried in the pocket of the user, if desired, the lens frame is moved to the position shown in the dotted lines Fig. 1 and in full lines Fig. 2.

In operation, the tape 10 is first introduced between the lower rollers 6, 6 and then passed between the upper rollers, 5, 5 as shown, whereby that portion of the tape which is being read will be kept perfectly flat within the field of the magnifying lens. By reason of the slight resistance offered to the pulling of the tape between the rollers 6, 6, the portion of the tape between the two sets of rollers will be thus always kept flat and annoyance due to poor focusing will be avoided.

I find by actual experiment that with such a device as I have described it is readily possible with a lens one-half inch in diameter and of one and one-half inches focal distance, to effectively read ordinary typewritten matter when reduced ten diameters; and that with such a device I can readily encompass fifteen lines of the microscopic matter before it is necessary to shift the tape to bring a successive portion thereof into the field of view.

Having now described my invention, what I claim as new therein and desire to secure by Letters Patent is as follows:

1. In a reading machine the combination of a tape carrying reading matter composed of microscopic characters, a lens or magnifying system and means for effecting a relative movement of the tape with respect to the magnifying system at a fixed distance therefrom whereby the microscopic characters may be read by an observer using said magnifying system, substantially as set forth.

2. In a reading machine the combination of a tape carrying reading matter composed of microscopic characters arranged in parallel columns, a magnifying system, means for effecting a relative movement of the tape with respect to the magnifying system and at a fixed distance from the same, whereby the characters may be read by an observer using said magnifying system, and means for adjusting the magnifying system into line with any of said columns, substantially as set forth.

3. In a reading machine the combination of a tape carrying reading matter composed of microscopic characters, a magnifying system, and means for successively moving the tape across the field of the magnifying system, substantially as set forth.

4. In a reading machine the combination of a tape carrying reading matter composed of microscopic characters arranged in parallel columns, a magnifying system, means for effecting a relative movement of the tape with respect to the magnifying system at a fixed distance from the same, means for adjusting the magnifying system laterally into line with any one of said columns, and means for feeding the tape to bring successive portions thereof into the field of the magnifying system, substantially as set forth.

5. In a reading machine the combination of a tape carrying reading matter composed of microscopic characters, two sets of rollers between which the tape is passed so as to be drawn tightly between them in a fixed plane, means for feeding the tape, and a lens or magnifying system maintained at a fixed distance from the flat portion of the tape between the two sets of rollers for observing the microscopic characters thereon, substantially as set forth.

6. In a reading machine the combination of a folding frame, a lens or magnifying system folded to said frame, a tape carrying microscopic characters and means carried by the frame for moving the tape with respect to the lens or magnifying system, substantially as set forth.

7. In a reading machine the combination of a frame, a tape carrying microscopic characters arranged in parallel columns, and means carried thereby for feeding the tape, a lens or magnifying system for observing the microscopic characters on the tape and means for adjusting the lens laterally to bring the same into line with any of said columns, substantially as set forth.

This specification signed and witnessed this 17th day of Nov. 1920.

BRADLEY A. FISKE.

Witnesses:
ROBERT C. BROOKS,
ALFRED W. MELCHER.